United States Patent
Cho et al.

(10) Patent No.: US 8,402,122 B2
(45) Date of Patent: Mar. 19, 2013

(54) UPNP APPARATUS AND METHOD FOR PROVIDING UPNP NETWORK WITH MULTIPLE REMOTE ACCESS SERVICE

(75) Inventors: Seongho Cho, Seoul (KR); Sehee Han, Seoul (KR); Sanghyeon Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 301 days.

(21) Appl. No.: 12/354,139

(22) Filed: Jan. 15, 2009

(65) Prior Publication Data

US 2009/0182853 A1 Jul. 16, 2009

Related U.S. Application Data

(60) Provisional application No. 61/021,206, filed on Jan. 15, 2008.

(30) Foreign Application Priority Data

Jul. 11, 2008 (KR) ........................ 10-2008-0067814

(51) Int. Cl.
*G06F 15/177* (2006.01)
(52) U.S. Cl. ........ 709/222; 709/217; 709/220; 709/221; 370/310
(58) Field of Classification Search .................. 709/217, 709/220
See application file for complete search history.

(56) References Cited

U.S. PATENT DOCUMENTS

| | | | | |
|---|---|---|---|---|
| 6,944,280 B2* | 9/2005 | Suzuki | | 379/229 |
| 7,085,814 B1* | 8/2006 | Gandhi et al. | | 709/208 |
| 7,308,502 B2* | 12/2007 | Rouault | | 709/229 |
| 7,403,512 B2* | 7/2008 | Tsai et al. | | 370/338 |
| 7,549,076 B2* | 6/2009 | Hatasaki et al. | | 714/3 |
| 7,577,090 B2* | 8/2009 | Xu et al. | | 370/219 |
| 7,616,594 B2* | 11/2009 | Roberts et al. | | 370/310 |
| 7,620,703 B1* | 11/2009 | Shteyn | | 709/220 |
| 7,636,314 B1* | 12/2009 | Reams, III | | 370/237 |
| 7,657,657 B2* | 2/2010 | Rao et al. | | 709/248 |
| 7,664,991 B1* | 2/2010 | Gunda et al. | | 714/43 |
| 7,725,566 B2 | 5/2010 | Stirbu | | |

(Continued)

FOREIGN PATENT DOCUMENTS

KR 10-2004-0091368 A 10/2004
KR 10-2004-0110941 A 12/2004

(Continued)

OTHER PUBLICATIONS

Remote Access Architecture, Jan. 6, 2007, Contributing Members of the UPnP, pp. 1-31.*

(Continued)

*Primary Examiner* — Backhean Tiv
(74) *Attorney, Agent, or Firm* — Sughrue Mion, PLLC (57) ABSTRACT

A universal plug and play (UPnP) apparatus and method for providing a UPnP network with a multiple remote access service by operating a multiple remote access server (RAS) device in a UPnP home network and controlling the multiple RAS device by using a UPnP control point (CP). The communication method of a UPnP CP device, the method includes: discovering a neighboring remote access server (RAS) device that is capable of providing a remote access service in a home network according to a discovery result of a service status of an active RAS device that provides a remote access client (RAC) device with a remote access service; and transmitting identification information of the discovered neighboring RAS device to an Internet gateway device (IGD) of the home network or the RAC device of a remote network.

20 Claims, 7 Drawing Sheets

U.S. PATENT DOCUMENTS

| | | | |
|---|---|---|---|
| 7,734,777 B2* | 6/2010 | Raja et al. ............... 709/224 |
| 7,742,766 B2* | 6/2010 | Liu et al. ............... 455/436 |
| 7,751,321 B2 | 7/2010 | Song et al. |
| 7,809,787 B2* | 10/2010 | Nishio .................. 709/203 |
| 7,818,673 B2* | 10/2010 | Cunningham et al. ........ 715/734 |
| 8,301,749 B1* | 10/2012 | Finklestein et al. ......... 709/223 |
| 8,302,155 B2* | 10/2012 | Han et al. ............... 726/2 |
| 2004/0255029 A1* | 12/2004 | Manion et al. ............. 709/227 |
| 2006/0199621 A1* | 9/2006 | Stirbu et al. .............. 455/574 |
| 2006/0245403 A1* | 11/2006 | Kumar ................... 370/338 |
| 2007/0018784 A1* | 1/2007 | Yoon et al. ............... 340/3.7 |
| 2007/0043873 A1* | 2/2007 | Jones et al. .............. 709/227 |
| 2007/0064696 A1* | 3/2007 | Min ..................... 370/392 |
| 2007/0162165 A1* | 7/2007 | Stirbu et al. .............. 700/65 |
| 2007/0168458 A1* | 7/2007 | Costa-Requena et al. .... 709/217 |
| 2007/0180077 A1* | 8/2007 | Letca et al. .............. 709/223 |
| 2007/0192326 A1* | 8/2007 | Angal et al. .............. 707/10 |
| 2007/0244578 A1 | 10/2007 | Stirbu |
| 2007/0254630 A1* | 11/2007 | Moloney et al. ........... 455/410 |
| 2008/0159162 A1* | 7/2008 | Morikuni et al. ........... 370/252 |
| 2008/0208920 A1* | 8/2008 | Stirbu et al. .............. 707/201 |
| 2008/0212495 A1* | 9/2008 | Stirbu ................... 370/254 |
| 2009/0059945 A1* | 3/2009 | Yokomitsu et al. .......... 370/419 |
| 2009/0080453 A1* | 3/2009 | Stirbu ................... 370/433 |
| 2009/0129301 A1* | 5/2009 | Belimpasakis ............. 370/310 |
| 2009/0180486 A1* | 7/2009 | Han et al. ............... 370/401 |
| 2009/0182853 A1* | 7/2009 | Cho et al. ............... 709/222 |
| 2009/0187654 A1* | 7/2009 | Raja et al. ............... 709/224 |
| 2009/0210555 A1* | 8/2009 | Han et al. ............... 709/238 |
| 2009/0217083 A1* | 8/2009 | Hatasaki et al. ............ 714/4 |
| 2009/0303926 A1* | 12/2009 | Den Hartog et al. ......... 370/328 |
| 2010/0111073 A1* | 5/2010 | Cho et al. ............... 370/352 |
| 2010/0191829 A1* | 7/2010 | Cagenius ................ 709/219 |
| 2012/0246273 A1* | 9/2012 | Bornstein et al. ........... 709/217 |

FOREIGN PATENT DOCUMENTS

| | | |
|---|---|---|
| KR | 10-2004-0110942 A | 12/2004 |
| KR | 10-2005-0027500 A | 3/2005 |
| WO | 2008/133555 A1 | 11/2008 |

OTHER PUBLICATIONS

RATAConfig:1 Service, Nov. 16, 2006, Contributing Members of the UPnP, pp. 1-51.*

Bathrick, Greg, et al., DSL Forum TR-069, May 2004, DSLHome-Techncial Working Group, pp. 1-109.*

Extended European Search Report issued on Feb. 1, 2011 in the corresponding European Patent Application No. 09702555.5.

Fasbender, A. et., al. "Virtually at home: High-performance access to personal media", Ericsson review, No. 2, 2008, pp. 58-63.

UPnP Forum: "Remote Access Architecure: 1", Sep. 30, 2009, pp. 1-30.

Communication, dated Aug. 31, 2012, issued by the State Intellectual Property Office of P.R. China in corresponding Chinese Application No. 200980108216.7.

* cited by examiner

UPNP APPARATUS AND METHOD FOR PROVIDING UPNP NETWORK WITH MULTIPLE REMOTE ACCESS SERVICE

CROSS-REFERENCE TO RELATED PATENT APPLICATION

This application claims the benefit of U.S. Provisional Application No. 61/021,206 filed on Jan. 15, 2008 in the USPTO and Korean Patent Application No. 10-2008-0067814, filed on Jul. 11, 2008, in the Korean Intellectual Property Office, the disclosures of which are incorporated herein in their entirety by reference.

BACKGROUND OF THE INVENTION

1. Field of the Invention

Apparatuses and methods consistent with the present invention relates to a remotely accessible service to a universal plug and play (UPnP) home network. More specifically, the present invention relates to a UPnP apparatus and method for providing a UPnP network with a multiple remote access service by operating a multiple remote access server (RAS) device in a UPnP home network and controlling the multiple RAS device by using a UPnP control point (CP).

2. Description of the Related Art

According to the popularity of home networks, a conventional PC network-oriented environment increasingly extends to an environment including home appliances using various lower network techniques. Therefore, a universal plug and play (UPnP) technology has been proposed in order to network these home appliances in a unified manner by using an IP protocol. The UPnP device architecture version 1.0 enables home appliances to be peer-to-peer networked on the basis of a distributed and open networking structure instead of being under centralized control. The UPnP device architecture version 1.0 uses the distributed and open networking to discover a UPnP device via an IP multicast in the home network. However, an IP multicast service is not guaranteed to be normally provided within the range of the Internet, making it impossible to control the UPnP device via the Internet since such control of the UPnP device needs information obtained by discovering the UPnP device.

Therefore, when the UPnP device or a control point (CP) device is physically separated and far from the home network, UPnP remote access architecture has been proposed so as to allow the UPnP device or the CP device to operate normally as if both were physically in the same network. The UPnP remote access architecture defines a remote access server (RAS) device within the home network and a remote access client (RAC) device within a remote network.

SUMMARY OF THE INVENTION

The present invention provides a universal plug and play (UPnP) apparatus and method for providing a UPnP network with a reliable multiple remote access service.

According to an aspect of the present invention, there is provided a communication method of a universal plug and play (UPnP) control point (CP) device, the method comprising: discovering a neighboring remote access server (RAS) device that is capable of providing a remote access service in a home network according to a discovery result of a service status of an active RAS device that provides a remote access client (RAC) device with a remote access service; and transmitting identification information of the discovered neighboring RAS device to an Internet gateway device (IGD) of the home network or the RAC device of a remote network.

The service status of the active RAS device may be one of a normal operation, a device error, and a network connection error, wherein the discovering of the neighboring RAS device is performed when the discovery result of the service status of the active RAS device is the device error or the network connection error.

The discovering of the neighboring RAS device may comprise: when the UPnP CP device is in the home network, discovering the neighboring RAS device; and when the UPnP CP device is in the remote network, discovering the neighboring RAS device in a list previously registered by a management console.

The transmitting of the identification information of the neighboring RAS device to the IGD may comprise: when the UPnP CP device is in the home network, transmitting the identification information of the neighboring RAS device to the IGD so that the IGD forwards given remote connection data to the neighboring RAS device; and the transmitting of the identification information of the neighboring RAS device to the RAC device comprises: when the UPnP CP device is in the remote network, transmitting the identification information of the neighboring RAS device to the RAC device so that the RAC device reestablishes a remote connection to the neighboring RAS device.

The method may further comprise: when the UPnP CP device is in the home network, synchronizing remote connection information between the active RAS device and the neighboring RAS device.

The synchronizing of the remote connection information may comprise: requesting the active RAS device for remote connection information at a predetermined time; and forwarding the received remote connection information to the neighboring RAS device.

The predetermined time may be a time that was previously established at periodic intervals, and is a time where the service status of the active RAS device is discovered as a network connection error status.

The UPnP CP device may be a separate device, when the UPnP CP device is in the home network, the UPnP CP device is included in the IGD, or when the UPnP CP device is in the remote network, the UPnP CP device may be in the RAC device.

According to another aspect of the present invention, there is provided a method of providing a home network with an Internet access service in a UPnP IGD, the method comprising: receiving identification information of an active RAS device providing a remote access service from a UPnP CP device; and when the identification information of the active RAS device is changed, forwarding given connection data from an RAC device to the active RAS device.

According to another aspect of the present invention, there is provided an UPnP CP device comprising: a neighboring RAS discovering unit discovering a neighboring RAS device that is capable of providing a remote access service in a home network according to a discovery result of a service status of an active RAS device that provides an RAC device with a remote access service; and a neighboring RAS identification information transmitting unit transmitting identification information of the discovered neighboring RAS device to an IGD of the home network or the RAC device of a remote network.

According to another aspect of the present invention, there is provided an UPnP IGD comprising: an active RAS identification information receiving unit receiving identification information of an active RAS device providing a remote access service from a UPnP CP device; and an active RAS forwarding unit, when the identification information of the active RAS device is changed, forwarding given connection data from an RAC device to the active RAS device.

According to another aspect of the present invention, there is provided a computer readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. Like reference numerals in the drawings denote like elements. In the drawings, the thicknesses of layers and regions are exaggerated for clarity.

Figure 1:
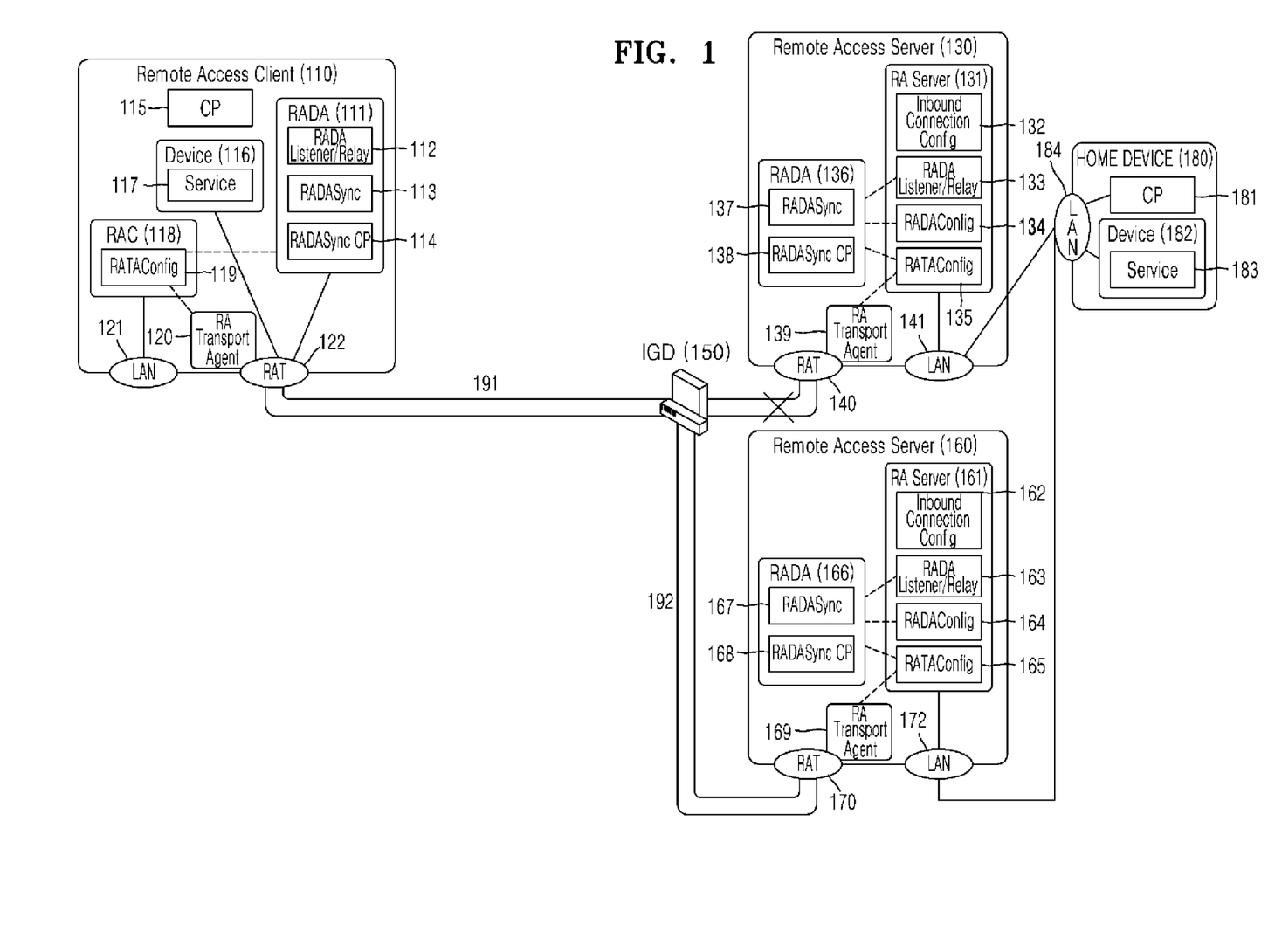
FIG. 1 is a schematic diagram of a universal plug and play (UPnP) multiple remote access architecture environment that provides a multiple remote access service according to an embodiment of the present invention.

FIG. 1 is a schematic diagram of a universal plug and play (UPnP) multiple remote access architecture environment that provides a multiple remote access service according to an embodiment of the present invention. Referring to FIG. 1, remote access server (RAS) devices 130 and 160 that are logical devices for supporting the multiple remote access service may physically be the same as or different from an Internet gateway device (IGD) 150. The RAS devices 130 and 160 doing the most important role for the remote access service may be distributed in order to support a stable multiple remote access service. In particular, distributed RAS devices may be useful for an enterprise network or a small office and home office (SOHO) network. In this regard, each RAS device supports remote access client (RAC) devices that are registered and served. However, when a device error or a networking error occurs, a RAS device cannot provide the remote access service. Therefore, the present embodiment provides a new remote access architecture that operates multiple RAS devices in a home network.

The RAS devices 130 and 160 and a home device 180 are UPnP devices within the home network. An RAC device 110 is a remote UPnP device away from the home network.

Remote access transport agent (RATA) 120, 139, and 169 provide a secure communication channel between the RAC device 110 and the RAS devices 130 and 160. In general, a virtual private network (VPN) is used to implement the communication channel.

A management console (not shown) uses RATA Config services 119, 135, and 165 to provide parameters necessary for establishing remote access transport channels (RATCs) 191 and 192. The RATA Config services 119, 135, and 165 are provided by the RAC device 110 and the RAS devices 130 and 160. The management console is a control point (CP) comprising a user interface.

In general, since a remote device, i.e., the RAC device 110, begins remote access using RATA, the RAS devices 130 and 160 of the home network must be discoverable and reachable over the Internet. InboundConnectionConfig services 132 and 162 provide interfaces so that a network manager can configure settings necessary for the RAC device 110 to establish the RATC 191 and 192 to the RAS devices 130 and 160 respectively.

Remote access discovery agents (RADAs) 111, 136, and 166 that perform a discovery operation in the UPnP network synchronize a network image with regard to a list of devices discovered in the home network between the home network and the remote network. The synchronizing of the network image is that devices and services discovered by the RAS devices 130 and 160 after the discovery operation is performed and devices and services recognized by the RAC device 110 are the same as each other, respectively. To this end, RADAListener and RADARelay 112, 133, and 163 that are logical function modules are defined.

The RADAListener/Relay 112, 133, and 163 monitor a simple service discovery protocol (SSDP) message, and, when a device joins or leaves the home network, provides the RADAs 111, 136, and 166 with information about the joining or leaving device. The RADAListener/Relay 112, 133, and 163 relay a periodic SSDP announcement message with regard to each device of a network image of the remote network, an expiration message when each device is removed, a multicast event message when the network image of the remote network is changed, etc. to the home network to which the RADAListener/Relay 112, 133, and 163 belong. The RADA Listener/Relay 112, 133, and 163 respond to an SSDP query (M-Search) of each device in the home network with regard to each device in the remote network.

When a new device or service is added to the home network, RADA SyncCPs 138 and 168 of the RAS devices 130 and 160 use an AddRemoteDevice ( ) action provided by an RADASync service 113 of the RAC device 110 to transmit the added device or service to the RAC device 110 so that the network image is synchronized between the home network and the remote network.

In the same manner as performed in the home network, when a new device or service is added to the remote network, an RADASync CP 114 of the RAC device 110 uses the AddRemoteDevice ( ) action provided by the RADASync service 137 and 167 of the RAS device 130 and 160 to transmit the added device or service to the RAS devices 130 and 160 so that the network image is synchronized between the home network and the remote network.

The RAC device 110 may discover a service from the synchronized network image, and request the discovered service directly to the UPnP device 180 through the RATC 191 and 192. In this regard, the RAS devices 130 and 160 function as a router.

RADAConfig services 134 and 164 of the RAS devices 130 and 160 are used to allow a user to select the network image provided by the RADAs 136 and 166 to the remote network. The RADAConfig services 134 and 164 provide interfaces that enable the user to input filtering information.

Figure 2:
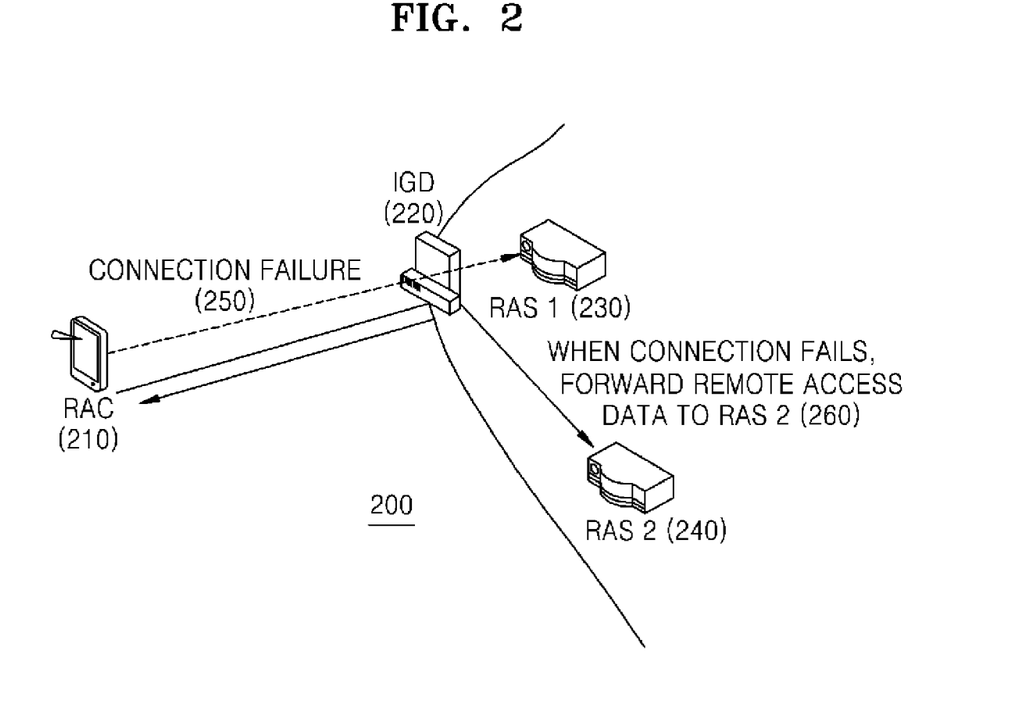
FIG. 2 illustrates a multiple remote access service in an environment where multiple RAS devices are connected to a single Internet gateway device (IGD) according to an embodiment of the present invention.

FIG. 2 illustrates a multiple remote access service in an environment where multiple RAS 1 device 230 and RAS 2 device 240 are connected to a single IGD 220 according to an embodiment of the present invention. Referring to FIG. 2, the multiple remote access service can be provided when information and functions are duplicated and operated between the multiple RAS devices, RAS device 1 230 and RAS device 2 240. When an RAC device 210 does not continue a remote connection to a home network since the first RAS device 1 230 (active RAS device) no longer provides the remote access service due to a device error or a network error, a CP device (not shown) of the home network discovers such a status, and informs the serviceable second RAS device 2 240 (neighboring RAS device) of the IGD 220. The IGD 220 is connected to the second RAS device 2 240 so that the RAC device 210 can be continuously connected to the home network.

In the present embodiment, the multiple RAS devices, RAS device 1 230 and RAC device 2 240 operate in the home network and the UPnP CP of the home network controls operation of the multiple RAS devices, RAS device 1 230 and RAC device 2 240, thereby providing the RAC device 210 with a transparent and reliable remote access service when an error occurs in the active RAS device f1 230 that provides a current remote access service.

Figure 3:
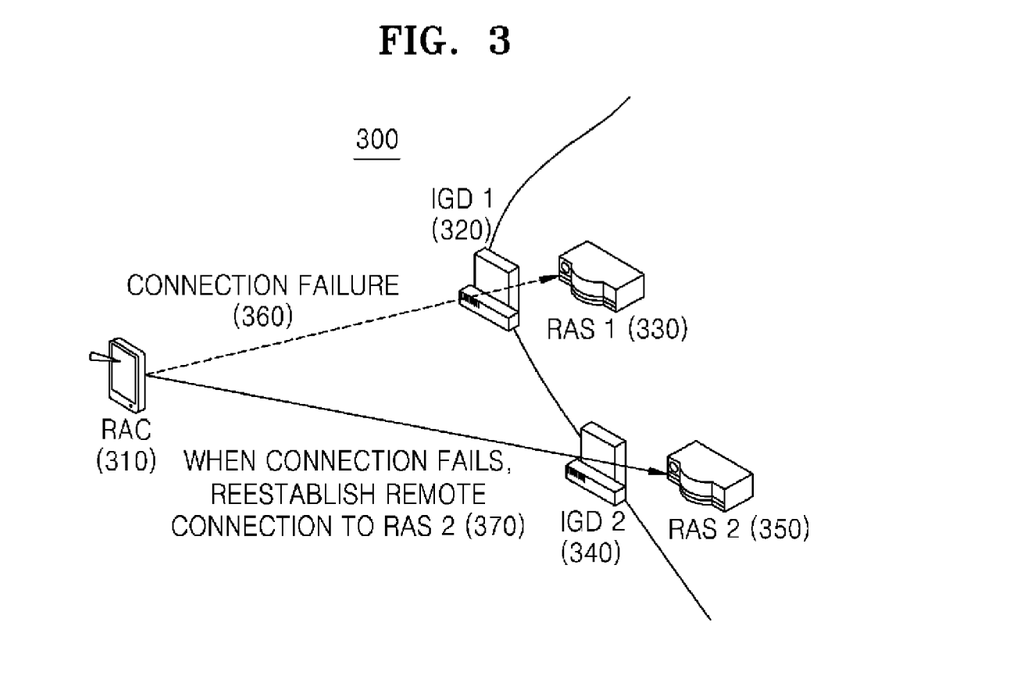
FIG. 3 illustrates a multiple remote access service in an environment where multiple RAS devices are connected to multiple IGDs, respectively, according to another embodiment of the present invention.

FIG. 3 illustrates a multiple remote access service in an environment where multiple RAS devices, RAS device 1 330 and RAS device 2 350, are connected to multiple IGDs, IGD 1 320 and IGD 2 340, respectively, according to another embodiment of the present invention. Referring to FIG. 3, when an RAC device 310 does not continue a remote connection to a home network since the first RAS device 1 330 no longer provides the remote access service due to a device error or a network error, a CP device (not shown) of a remote network discovers such a status, and informs the RAC device 310 about identification information of the serviceable second RAS device 2 350.

Since the RAS device 1 330 and RAS device 2 350 are connected to the IGD 1 320 and IGD 2 340, respectively, RATA profiles necessary for establishing an RATC 299 differ from each other. Therefore, the CP device of the remote network previously registers each RATA profile including identification information of the RAS device 1 330 and RAS device 2 350 by a management console, and transmits the RATA profile including the identification information of the serviceable second RAS device 2 350 to the RAC device 310. The RAC device 310 uses the RATA profile regarding a remote connection to the second RAS device 2 350 to actively reestablish the remote connection to the second RAS device 2 350, thereby implementing a connection to the home network.

In the present embodiment, the multiple RAS devices, RAS device 1 330 and RAS device 2 350, operate in the home network and the UPnP CP of the remote network controls to operate the multiple RAS devices, RAS device 1 330 and RAS device 2 350, thereby providing the reliable remote access service through the remote connection to the second RAS device 2 350 reestablished by the RAC device 310 when an error occurs in the active RAS device 1 330 that provides a current remote access service.

Figure 4:
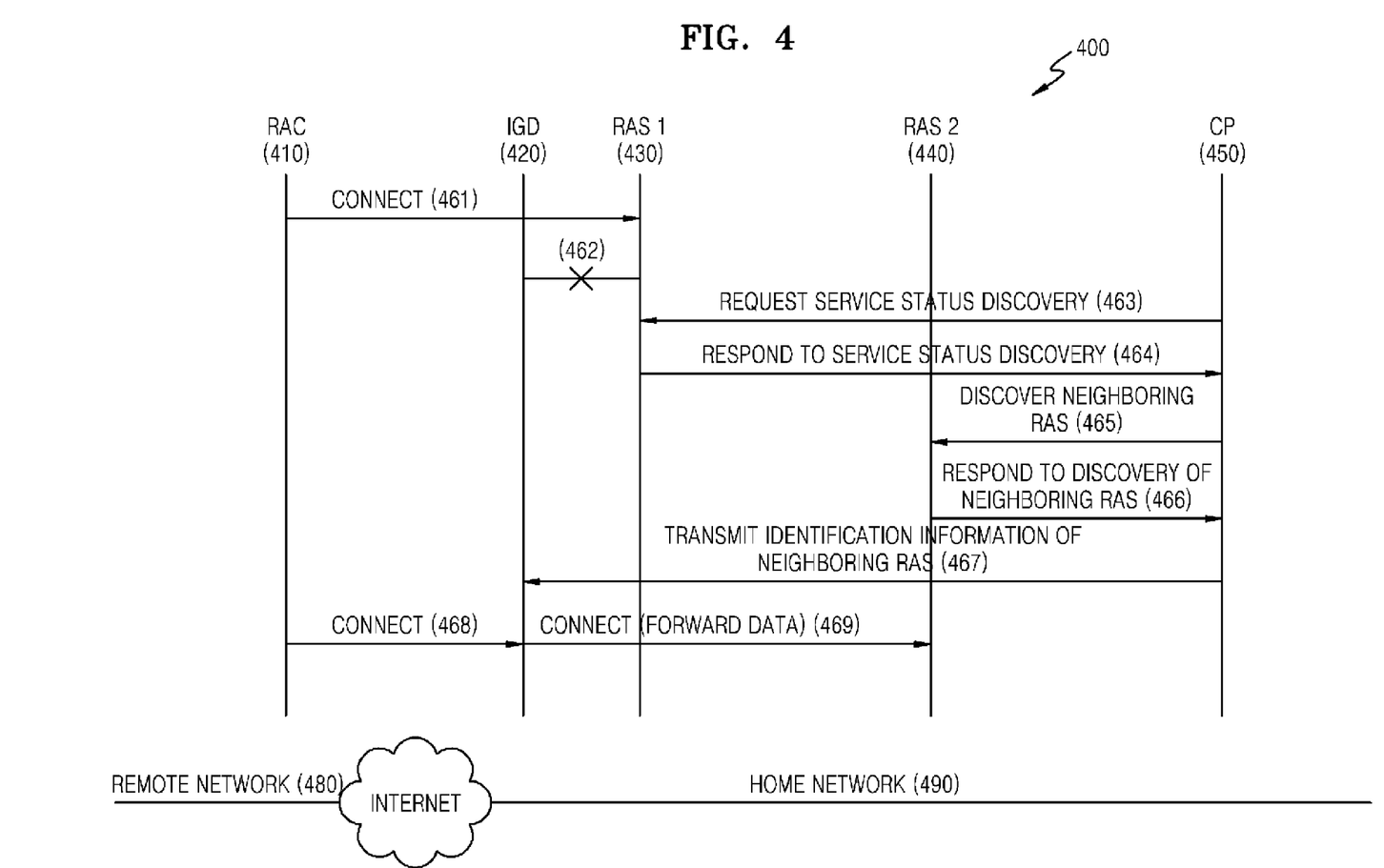
FIG. 4 illustrates a discovery process for using a neighboring RAS device when an error occurs in an active RAS device in an environment where multiple RAS devices are connected to a single IGD according to an embodiment of the present invention.

FIG. 4 illustrates a discovery process for using a neighboring RAS device when an error occurs in an active RAS device in an environment where multiple RAS devices, RAS device 1 430 and RAS device 2 440, are connected to a single IGD 420 according to an embodiment of the present invention. Referring to FIG. 4, when an RAC device 410 is remotely connected to the first RAS device 1 430 (the active RAS device) in operation 461, if the first RAS device 1 430 does not provide the RAC device 410 with a remote access service due to a device error or a network error in operation 462, a UPnP CP device 450 of a home network discovers such a service status in operations 463 and 464 or receives an event message from the first RAS device 1 430 (not shown).

The UPnP CP device 450 discovers the second RAS device 2 440 (the neighboring RAS device) that is capable of providing a remote access service in operations 465 and 466, and transmits information about the neighboring RAS device to the IGD 420 in operation 467. When identification information of the active RAS device is changed, the IGD 467 forwards given connection data of the RAC device 410 to the changed active RAS device in operation 469.

Figure 5:
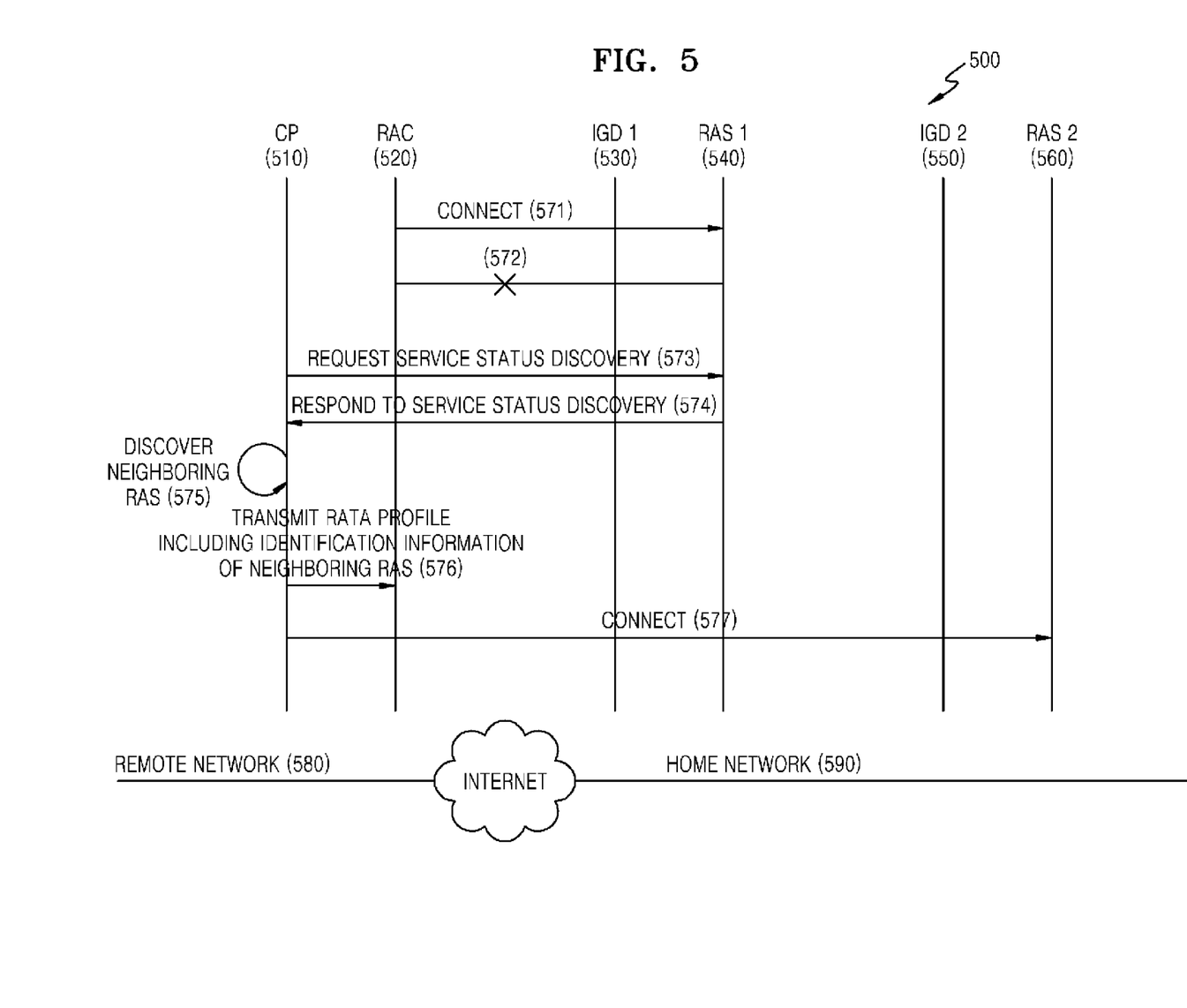
FIG. 5 illustrates a discovery process for using a neighboring RAS device when an error occurs in an active RAS device in an environment where multiple RAS devices are connected to multiple IGDs, respectively, according to another embodiment of the present invention.

FIG. 5 illustrates a discovery process for using a neighboring RAS device when an error occurs in an active RAS device in an environment where multiple RAS devices, RAS device 1 540 and RAS device 2 560, are connected to multiple IGDs, IGD 1 530 and IGD 2 550, respectively, according to another embodiment of the present invention. Referring to FIG. 5, when an RAC device 520 is remotely connected to the first RAS device 1 540 (the active RAS device) in operation 571, if the active RAS device does not provide the RAC device 520 with a remote access service due to a device error or a network error in operation 572, a UPnP CP device 510 of a remote network discovers such a service status in operations 573 and 574 or receives an event message from the active RAS device (not shown).

The UPnP CP device 510 discovers the second RAS device 2 560 (the neighboring RAS device) that is capable of providing an remote access service in operation 575, and transmits a RATA profile including identification information of the neighboring RAS device to the RAC device 520 in operation 576. When the active RAS device is changed, the RAC device 520 reestablishes the remote connection to the changed active RAS device in operation 577.

Figure 6:
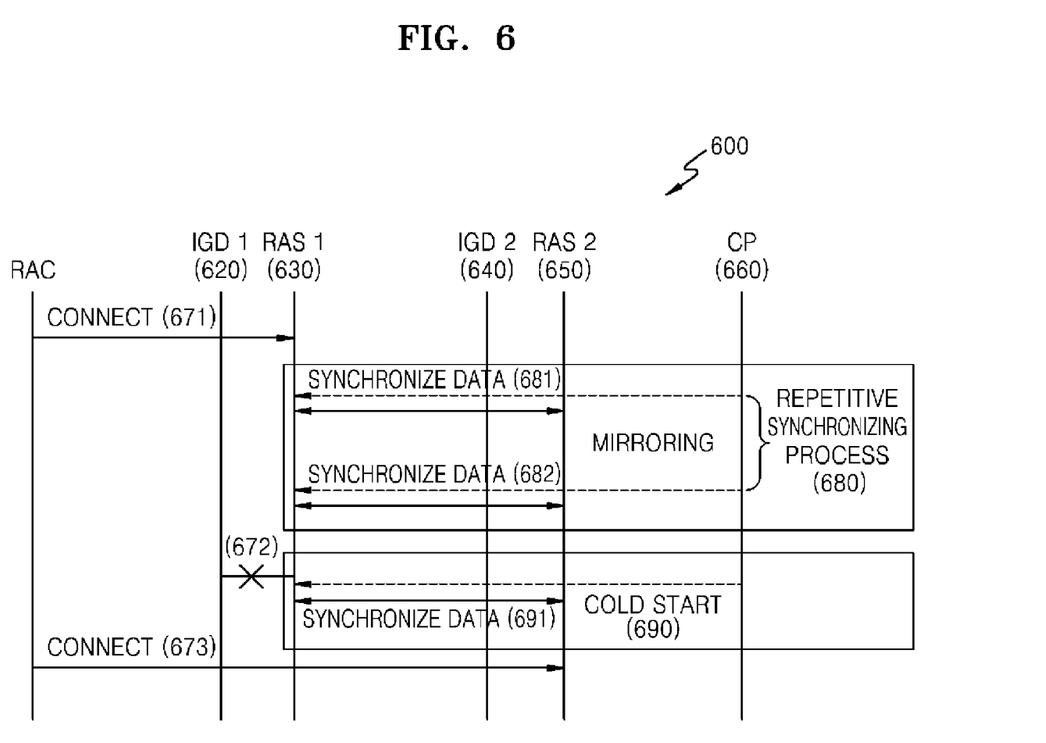
FIG. 6 illustrates a process of synchronizing remote connection information between multiple RAS devices according to an embodiment of the present invention.

FIG. 6 illustrates a process of synchronizing remote connection information between multiple RAS devices, RAS device 1 630 and RAS device 2 650, according to an embodiment of the present invention. Referring to FIG. 6, a mirroring method 680 comprises the neighboring RAS device 2 650 continuously duplicating information of an active RAS device 1 630 in operation 681 and 682. A cold start method 690 comprises the neighboring RAS device 2 650 not operating while the active RAS device 1 630 is operating, and the neighboring RAS device 2 650 duplicating information of the active RAS device 1 630 in operation 691 when a service of the active RAS device 1 630 is stopped in operation 672.

The mirroring method 680 can support both service statuses of the active RAS device 1 630 in which a device error or a network connection error occurs, whereas the cold start method 690 can support the service status of the active RAS device 1 630 in which the network connection error occurs. In the mirroring method 680 and the cold start method 690, the network connection error means an network connection error over the internet, not in the home network.

In the present embodiment, a UPnP CP device 660 performs two synchronizing methods. The UPnP CP device 660 requests the active RAS device 1 630 for remote connection information at a time that was previously established at periodic intervals (the mirroring method 680) or at a time where the service status of the active RAS device 1 630 is discovered as stopped (the cold start method 690). The UPnP CP device 660 forwards the received remote connection information to the neighboring RAS device 2 650, thereby synchronizing the remote connection information between the multiple RAS devices, RAS device 1 630 and RAS device 2 650.

Figure 7:
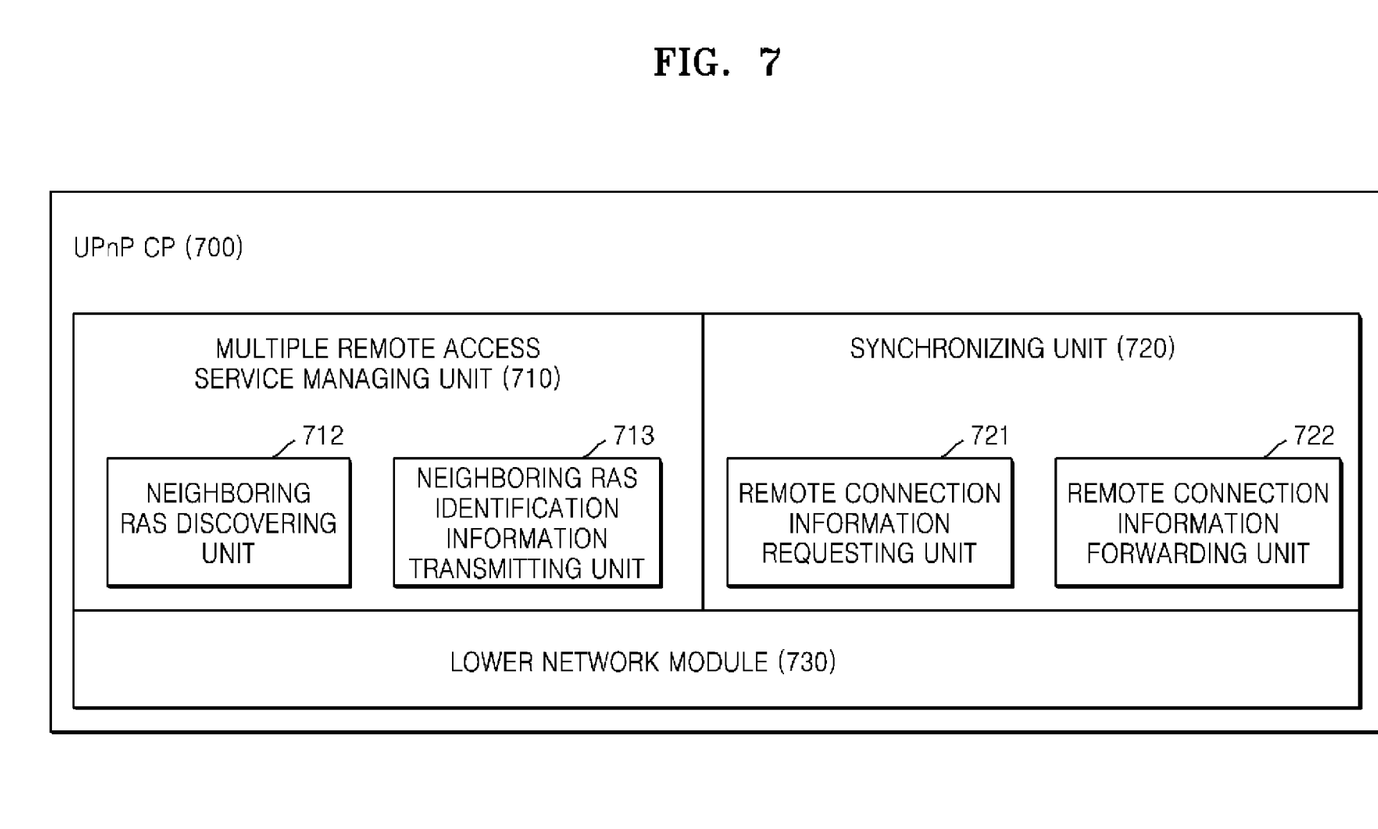
FIG. 7 is a block diagram of a UPnP control point (CP) device according to an embodiment of the present invention.

FIG. 7 is a block diagram of a UPnP CP device 700 according to an embodiment of the present invention. Referring to FIG. 7, the UPnP CP device 700 of a home network comprises a multiple remote access service managing unit 710 and a synchronizing unit 720. The multiple remote access service managing unit 710 comprises a neighboring RAS discovering unit 712 and a neighboring RAS identification information transmitting unit 713. The synchronizing unit 720 comprises a remote connection information requesting unit 721 and a remote connection information forwarding unit 722.

In an environment where multiple RAS devices are connected to a single IGD, the multiple remote access service managing unit 710 informs the IGD of identification information of a neighboring RAS device that is capable of providing a remote access service when an active RAS device that is capable of providing a current remote access service does not normally operate.

In more detail, the neighboring RAS discovering unit 712 discovers a service status of the active RAS device that is capable of providing the current remote access service, when a device error or a network connection error occurs in the service status of the active RAS device, and discovers the neighboring RAS device that is capable of providing the remote access service. The neighboring RAS identification information transmitting unit 713 transmits the identification information of the neighboring RAS device to the IGD so that the IGD can forward given remote connection data to the neighboring RAS device.

The synchronizing unit 720 synchronizes the remote connection information between multiple RAS devices. In more detail, the remote connection information requesting unit 721 requests the remote connection information for the active RAS device at a predetermined time. The remote connection information forwarding unit 722 forwards the remote connection information requested by the remote connection information requesting unit 721 to the neighboring RAS device. Meanwhile, according to a synchronization method, the predetermined time is a time that was previously established at periodic intervals in the mirroring method, and is a time where a service status of the active RAS device is discovered as a network connection error status in the cold start method. In the present embodiment, the UPnP CP device 700 may be a physically separate device of the home network or may be included in the UPnP IGD device.

In another embodiment, a UPnP CP of a remote network comprises the multiple remote access service managing unit 710. In an environment where multiple RAS devices are connected to multiple IGDs, respectively, the multiple remote access service managing unit 710 informs an RAC device of a RATA profile including identification information of a neighboring RAS device that is capable of providing a remote access service when an active RAS device that is capable of providing a current remote access service does not normally operate.

In more detail, the neighboring RAS discovering unit 712 discovers a service status of the active RAS device that is capable of providing the current remote access service, when a device error or a network connection error occurs in the service status of the active RAS device, and discovers the neighboring RAS device that is capable of providing the remote access service. The neighboring RAS identification information transmitting unit 713 transmits the RATA profile including the identification information of the neighboring RAS device to the RAC device so that the RAC device can reestablish a remote connection to the neighboring RAS device.

Figure 8:
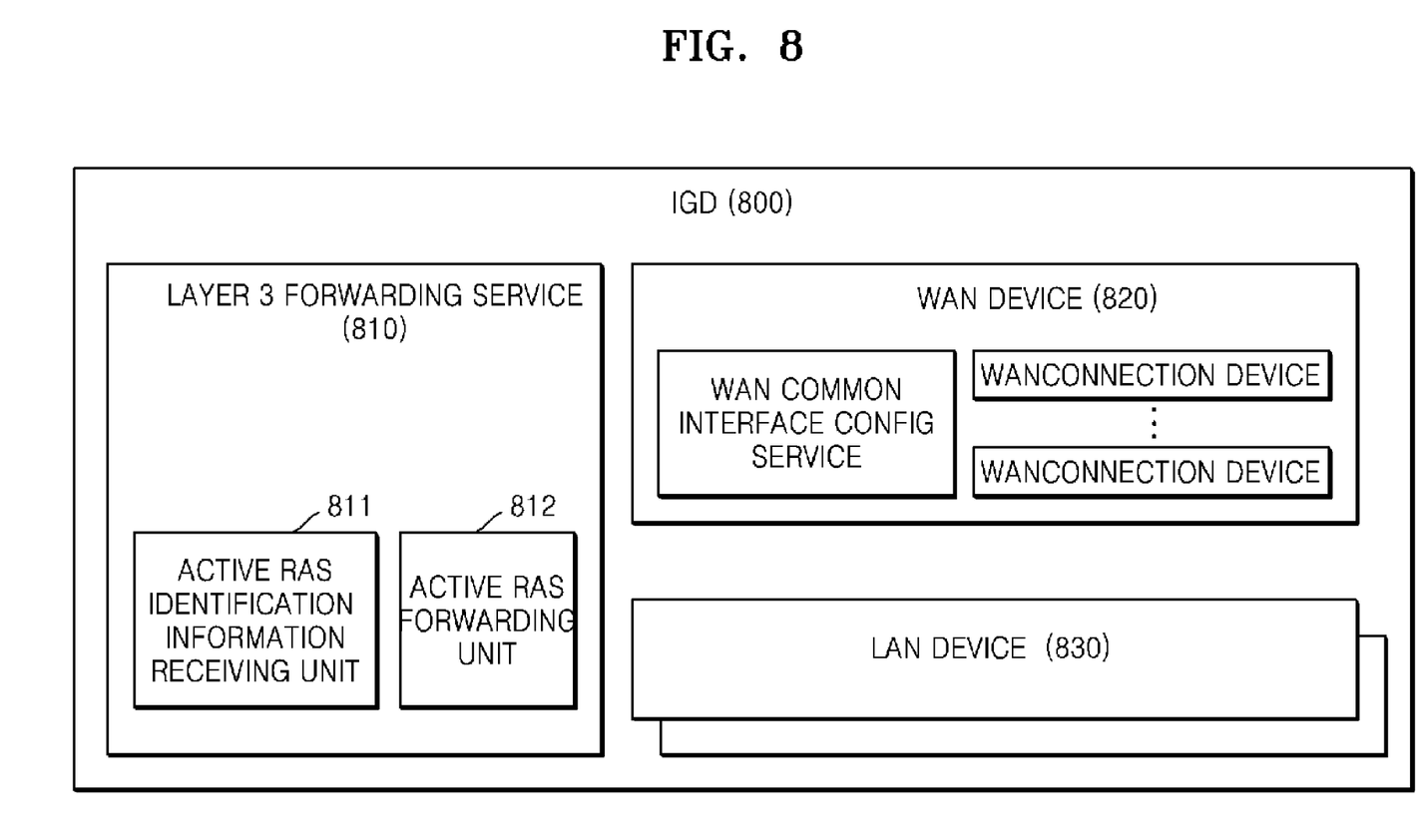
FIG. 8 is a block diagram of a UPnP IGD according to an embodiment of the present invention.

FIG. 8 is a block diagram of a UPnP IGD 800 according to an embodiment of the present invention. Referring to FIG. 8, the UPnP IGD 800 comprises an active RAS identification information receiving unit 811 and an active RAS forwarding unit 812. The active RAS identification information receiving unit 811 receives identification information of an active RAS device from a UPnP CP device of a home network. When the identification information of the active RAS device is changed, the active RAS forwarding unit 812 forwards given connection data from an RAC device to the active RAS device. In the present embodiment, although a Layer3Forwarding service 810 of the UPnP IGD 800 comprises the active RAS identification information receiving unit 811 and the active RAS forwarding unit 812, another service of the UPnP IGD 800 may comprise the active RAS identification information receiving unit 811 and the active RAS forwarding unit 812 according to another embodiment.

The invention can also be embodied as computer readable codes on a computer readable recording medium. The computer readable recording medium is any data storage device that can store data, which can be thereafter read by a computer system. Examples of the computer readable recording medium (including all devices having information process functions) include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A communication method of a universal plug and play (UPnP) control point (CP) device, the method comprising:
   discovering, by the control point (CP) device, a service status of an active remote access server (RAS) device that provides a remote access client (RAC) device of a remote network, with a remote access service;
   discovering, by the CP device, a neighboring RAS device that provides the remote access service in a home network according to the discovery result of a service status of the active RAS device; and
   transmitting, by the CP device, identification information of the discovered neighboring RAS device to an Internet gateway device (IGD) of the home network,
   wherein the transmitting, by the CP device, the identification information of the discovered neighboring RAS device to the IGD comprises: when the CP device is in the home network, transmitting, by the CP device, the identification information of the discovered neighboring RAS device to the IGD so that the IGD stops forwarding remote connection data for the remote access service from the RAC device to the active RAS device, and forwards remote connection data from the RAC device to the discovered neighboring RAS device.

2. The method of claim 1, wherein the discovering of the neighboring RAS device is performed when the discovery result of the service status of the active RAS device is device error or network connection error.

3. The method of claim 1, wherein the discovering of the neighboring RAS device comprises:
when the UPnP CP device is in the home network, discovering the neighboring RAS device; and
when the UPnP CP device is in the remote network, discovering the neighboring RAS device in a list previously registered by a management console.

4. The method of claim 1, wherein
the transmitting of the identification information of the discovered neighboring RAS device to the RAC device comprises: when the UPnP CP device is in the remote network, transmitting the identification information of the discovered neighboring RAS device to the RAC device so that the RAC device reestablishes a remote connection to the discovered neighboring RAS device.

5. The method of claim 1, further comprising: when the UPnP CP device is in the home network, synchronizing remote connection information between the active RAS device and the discovered neighboring RAS device.

6. The method of claim 5, wherein the synchronizing of the remote connection information comprises:
requesting the active RAS device for remote connection information at a predetermined time; and
forwarding the received remote connection information to the discovered neighboring RAS device.

7. The method of claim 6, wherein the predetermined time is a time that was previously established at periodic intervals, and is a time where the service status of the active RAS device is discovered as a network connection error status.

8. The method of claim 1, wherein the UPnP CP device is a separate device, or when the UPnP CP device is in the home network, the UPnP CP device is included in the IGD, or when the UPnP CP device is in the remote network, the UPnP CP device is in the RAC device.

9. A method of providing a home network with an Internet access service in a universal plug and play (UPnP) Internet gateway device (IGD), the method comprising:
receiving, by the Internet gateway device (IGD), identification information of a neighboring remote access server (RAS) device providing a remote access service from a UPnP control point (CP) device when it is discovered by the UPnP CP device that a service status of an active remote access server (RAS) device for providing a remote access service indicates device error or network connection error;
stopping, by the Internet gateway device (IGD), forwarding connection data for the remote access service from a remote access client (RAC) device to the active RAS device; and
forwarding, by the Internet gateway device (IGD), the connection data from the RAC device to the neighboring RAS device based on the identification information of the neighboring RAS device.

10. A universal plug and play (UPnP) control point (CP) device comprising:
a neighboring remote access server (RAS) discovering unit which discovers a service status of an active remote access server (RAS) device that provides a remote access client (RAC) device of a remote network with a remote access service and discovers a neighboring RAS device that provides the remote access service in a home network according to the discovery result of a service status of the active RAS device; and
a neighboring RAS identification information transmitting unit which transmits identification information of the discovered neighboring RAS device to an Internet gateway device (IGD) of the home network,
wherein the neighboring RAS identification information transmitting unit transmits, when the UPnP CP device is in the home network, the identification information of the discovered neighboring RAS device to the IGD so that the IGD stops forwarding remote connection data for the remote access service from the RAC device to the active RAS device, and forwards remote connection data from the RAC device to the discovered neighboring RAS device.

11. The UPnP CP device of claim 10, wherein the neighboring RAS discovering unit discovers the neighboring RAS device when the discovery result of the service status of the active RAS device is device error or network connection error.

12. The UPnP CP device of claim 10, wherein the neighboring RAS discovering unit which discovers, when the UPnP CP device is in the home network, the neighboring RAS device, and which discovers, when the UPnP CP device is in the remote network, the neighboring RAS device in a list previously registered by a management console.

13. The UPnP CP device of claim 10, wherein the neighboring RAS identification information transmitting unit transmits, when the UPnP CP device is in the remote network, the identification information of the discovered neighboring RAS device to the RAC device so that the RAC device reestablishes a remote connection to the discovered neighboring RAS device.

14. The UPnP CP device of claim 10, further comprising: a synchronizing unit which synchronizes, when the UPnP CP device is in the home network, remote connection information between the active RAS device and the discovered neighboring RAS device.

15. The UPnP CP device of claim 14, wherein the synchronizing unit comprises:
a remote connection information requesting unit which requests the active RAS device for remote connection information at a predetermined time; and
a remote connection information forwarding unit forwarding the received remote connection information to the discovered neighboring RAS device.

16. The UPnP CP device of claim 15, wherein the predetermined time is a time that was previously established at periodic intervals, and a time where the service status of the active RAS device is discovered as a network connection error status.

17. The UPnP CP device of claim 10, wherein the UPnP CP device is a separate device, or when the UPnP CP device is in the home network, the UPnP CP device is included in the IGD, or when the UPnP CP device is in the remote network, the UPnP CP device is in the RAC device.

18. A universal plug and play (UPnP) Internet gateway device (IGD) comprising:
an active remote access server (RAS) identification information receiving unit which receives identification information of a neighboring RAS device providing a remote access service from a UPnP control point (CP) device when it is discovered by the UPnP CP device that a service status of an active remote access server (RAS) device for providing a remote access service indicates device error or network connection error; and
an active RAS forwarding unit which stops forwarding connection data for the remote access service from a remote access client (RAC) device to the active RAS device, and forwards connection data from the RAC device to the neighboring RAS device based on the identification information of the neighboring RAS device.

19. A computer-readable recording medium having recorded thereon a computer program for executing the method of claim 1.

20. A computer-readable recording medium having recorded thereon a computer program for executing the method of claim 9.

* * * * *